July 14, 1953
C. F. CARAMELLI
2,645,272
SLIDING COUNTER SEAT
Filed Oct. 11, 1948
5 Sheets-Sheet 1
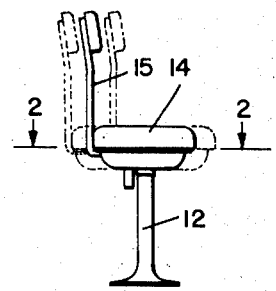
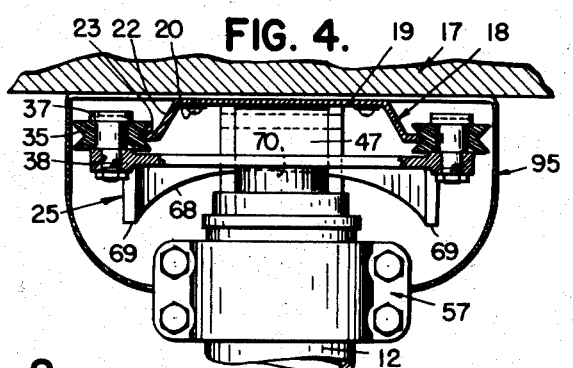
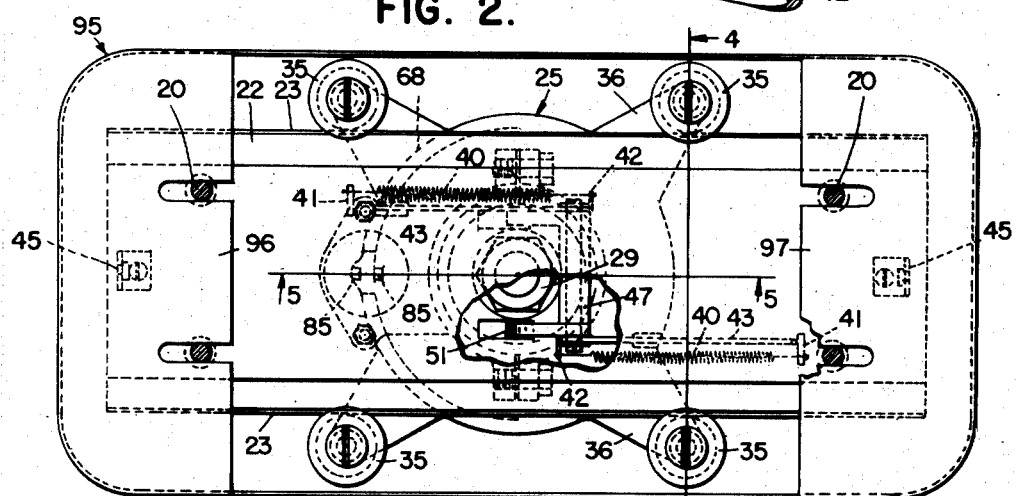
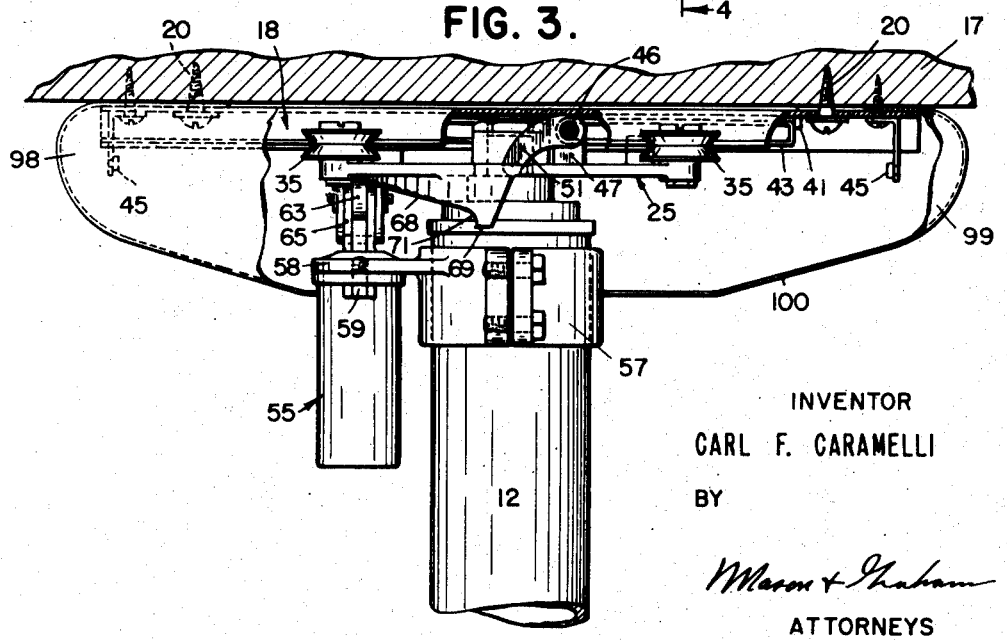
INVENTOR
CARL F. CARAMELLI
BY
*Mason + Graham*
ATTORNEYS

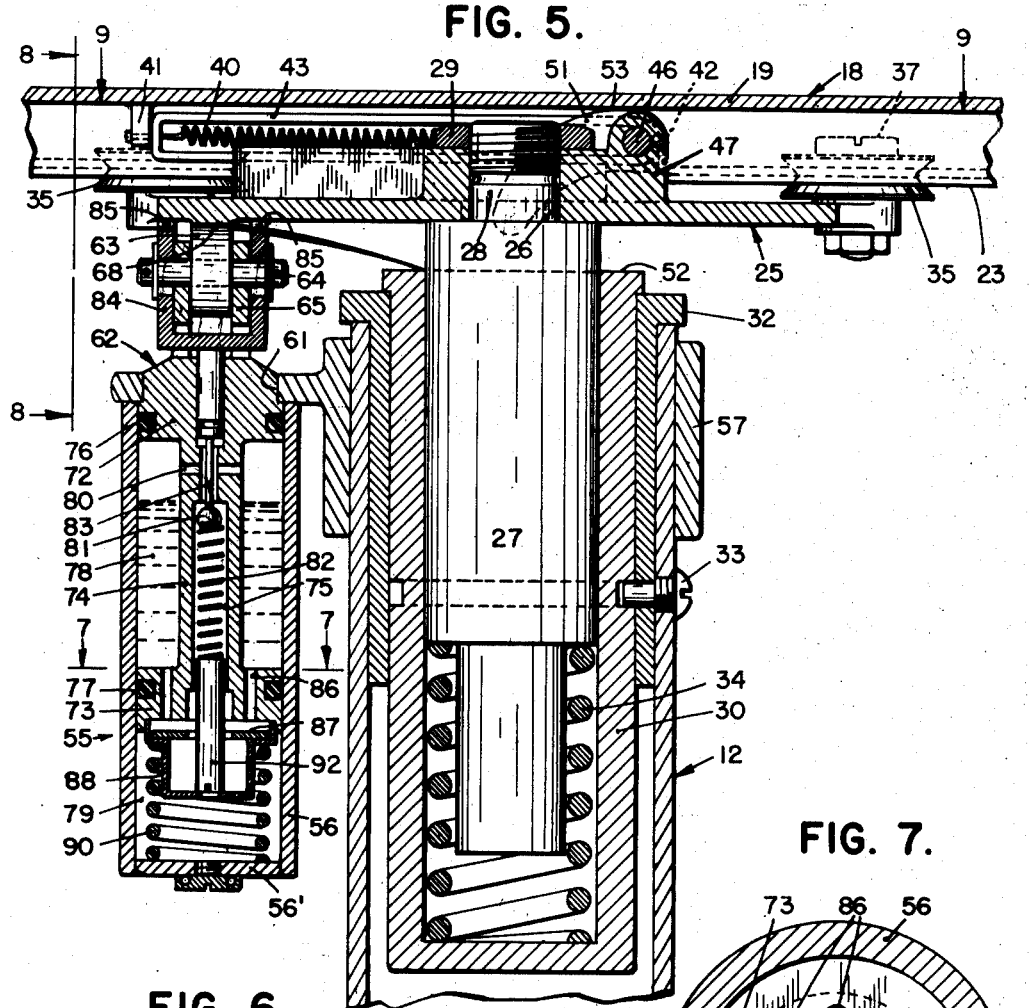
FIG. 5.
FIG. 6.
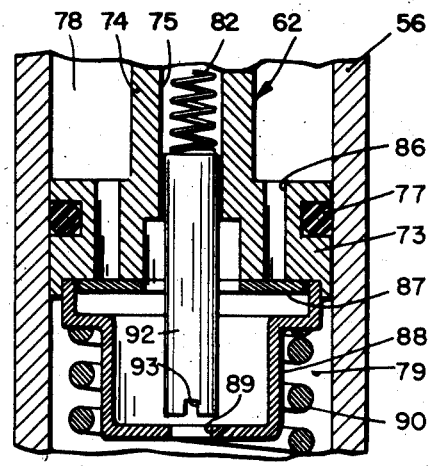
FIG. 7.
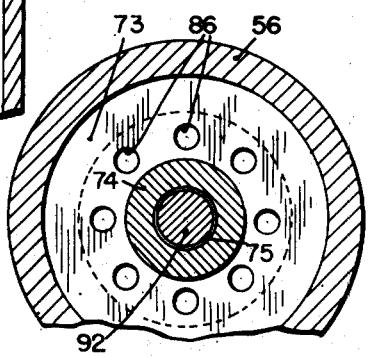
INVENTOR
CARL F. CARAMELLI
BY
ATTORNEYS July 14, 1953  C. F. CARAMELLI  2,645,272
SLIDING COUNTER SEAT
Filed Oct. 11, 1948  5 Sheets-Sheet 3
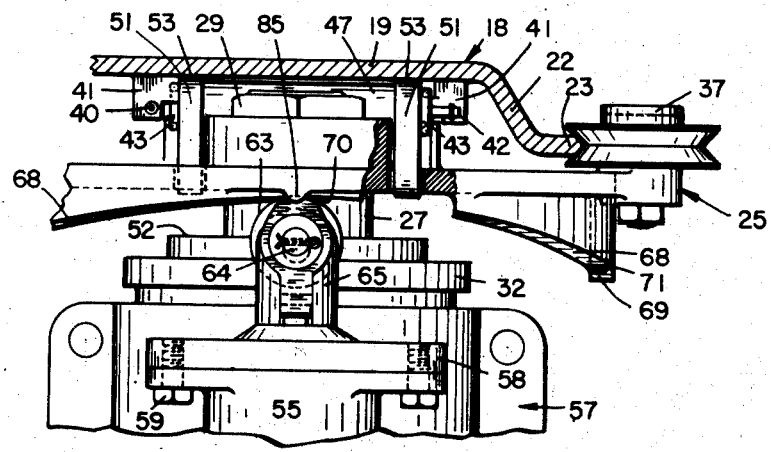
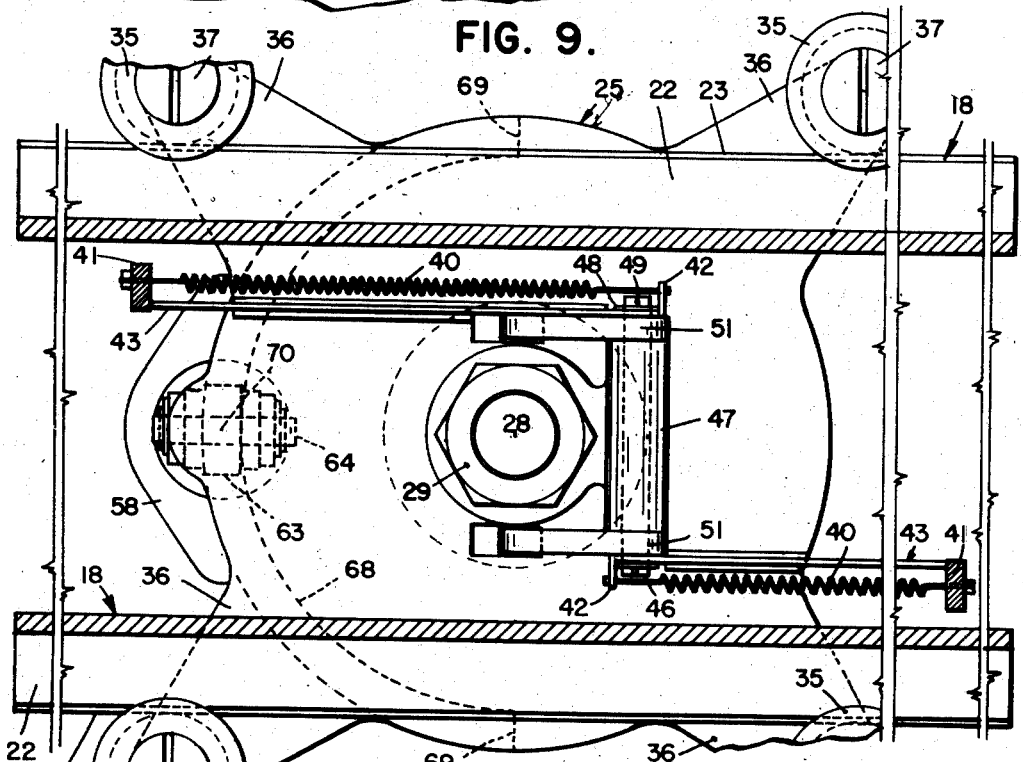
INVENTOR
CARL F. CARAMELLI
BY
Mason & Graham
ATTORNEYS

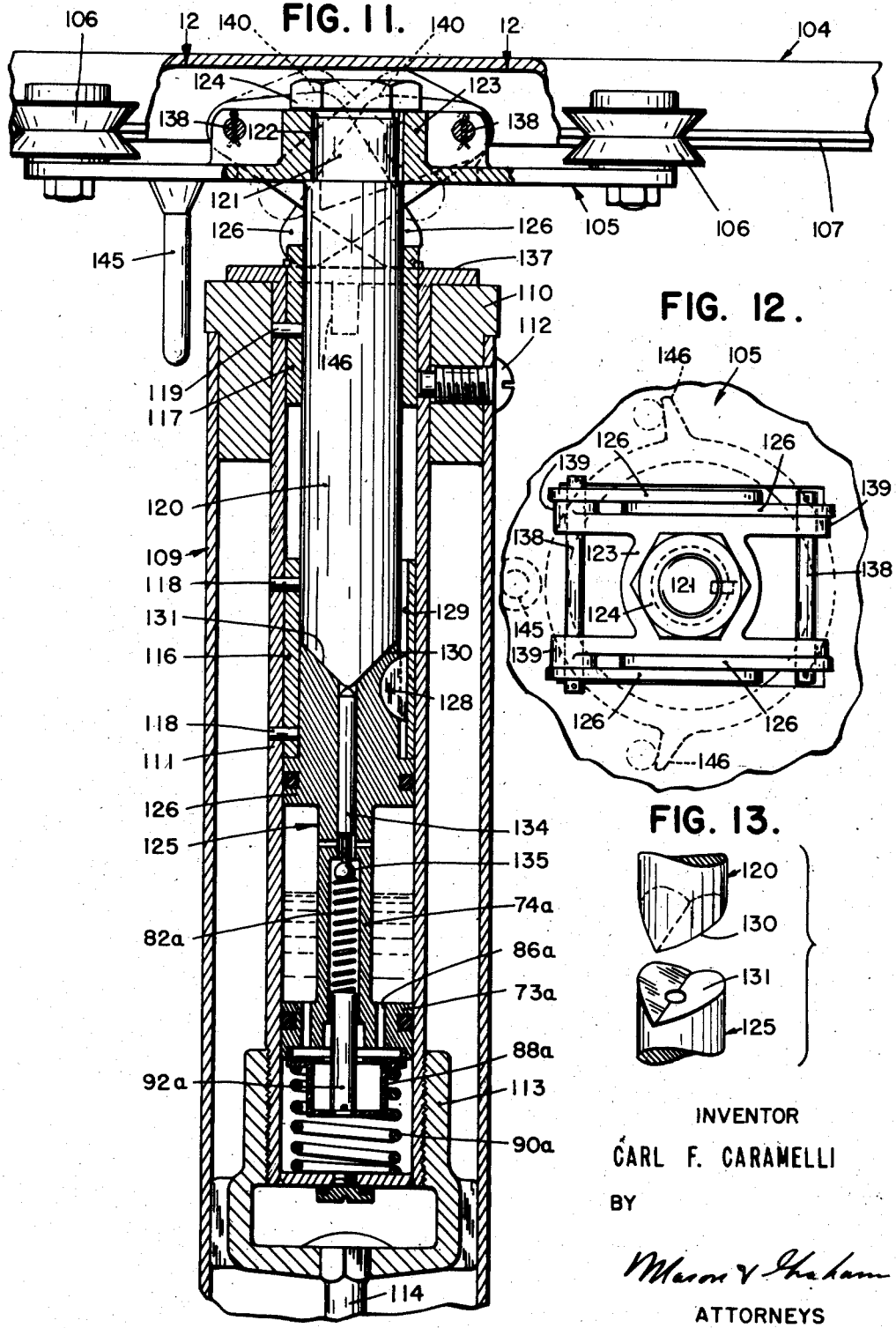

July 14, 1953 C. F. CARAMELLI 2,645,272
SLIDING COUNTER SEAT
Filed Oct. 11, 1948 5 Sheets-Sheet 5

INVENTOR
CARL F. CARAMELLI
BY
Mason & Graham
ATTORNEYS

Patented July 14, 1953

2,645,272

UNITED STATES PATENT OFFICE 2,645,272

SLIDING COUNTER SEAT

Carl F. Caramelli, Los Angeles, Calif., assignor to
Peter G. Caramelli, Los Angeles, Calif.

Application October 11, 1948, Serial No. 53,923

14 Claims. (Cl. 155—95)

This invention has to do with counter stools such as are commonly used in restaurants, drug stores, ice cream parlors and the like, in connection with a counter where customers are served. The invention is particularly concerned with an adjustable counter seat which may be moved by the customer relative to the counter to a position which is comfortable for him.

An object of this invention is to provide an improved, adjustable counter seat which may be easily operated by a person and which is designed to remain in adjusted position.

Another object is to provide a rotatable seat which also may be adjusted laterally, as toward and away from a counter, for example, and which embodies means whereby the seat automatically returns to a predetermined position.

A further object of the invention is to provide an automatic means for holding the seat in an adjusted position when a weight is imposed on it as when one is sitting on the seat. An object, in this connection, is to provide a delayed action holding means whereby a person sitting on the seat can make the necessary adjustments to suit his comfort before the holding means will become effective to lock the seat against movement.

A further object of the invention is to provide a holding or locking means of the type indicated which will only work when the seat is facing a given direction and which is actuated by the weight of a person on the seat.

A still further object of the invention is to provide an adjustable counter seat of the type indicated which is adapted to be mounted on present standards or columns, and another object is to provide a simplified construction particularly adapted to be embodied in new counter seats at the time of manufacture.

These and other objects will be apparent from the drawings and the following description thereof. Referring to the drawings:

Fig. 1 is a side elevational view of a counter seat of the type for which the invention is designed;

Fig. 2 is an enlarged view on the line 2—2 of Fig. 1;

Fig. 3 is a fragmentary side elevation of the device broken away to show parts in section;

Fig. 4 is a cross-section on line 4—4 of Fig. 2;

Fig. 5 is an enlarged fragmentary sectional view on line 5—5 of Fig. 2;

Fig. 6 is an enlarged fragmentary sectional view of a portion of the hydraulic unit;

Fig. 7 is a sectional view on the line 7—7 of Fig. 5;

Fig. 8 is a fragmentary section on line 8—8 of Fig. 5;

Fig. 9 is a section on line 9—9 of Fig. 5;

Fig. 10 is a perspective view of a self-centering bracket;

Fig. 11 is a sectional elevation of a device embodying another form of the invention;

Fig. 12 is a section on line 12—12 of Fig. 11;

Fig. 13 is a perspective view of the ends of the center pin and piston of the mechanism of Fig. 11;

Figure 15:
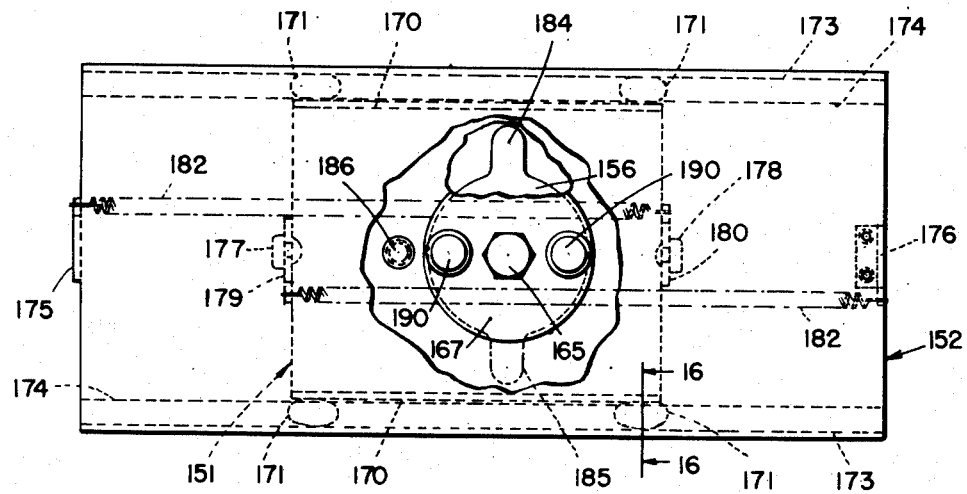
Fig. 15 is a plan view on line 15—15 of Fig. 14, partially broken away.

More particularly describing the invention, in Fig. 1 there is shown a counter seat or stool which embodies a standard 12, ordinarily secured to the floor, a seat member 14 and a back-rest 15.

Referring particularly to Figs. 2–10, reference numeral 17 (Fig. 3) indicates the frame of the upholstered seat. Attached to this frame is a seat base plate indicated by 18. This plate has a central flat section 19 which is secured to the seat frame as by means of screws 20. The base plate is provided with a pair of marginal flanges 22 forming tracks 23.

The device includes a bracket or mounting plate 25 which is centrally apertured at 26 to receive a mounting pin 27, having a portion 28 of reduced diameter which is received in the plate. The pin is threaded to take a nut 29. The mounting pin is mounted for rotation and for axial movement in a cup 30 which is supported in the tubular standard 12 by means of a flanged bushing 32 held in place by a screw 33. A spring 34 is interposed between the bottom of the pin and the bottom of the cup.

The mounting plate 25 carries four rollers 35 which are mounted in radial arms 36 extending from the plate which is shown as being otherwise substantially circular although the exact shape of the plate is unimportant. The rollers are rotatably supported on screws 37 received in holes 38 in the ends of the arms. Each of the rollers has a V-shaped groove and the rollers are adapted to receive and ride on the tracks 23 of the base plate 18.

It will be apparent that the counter seat may thus slide back and forth on the rollers 35. In order to provide for automatic return of the seat to its original position, a pair of springs 40 mounted on posts 41 (Figs. 5 and 9) extending from the seat base plate are provided. The other ends of the springs are attached to projections 42 on brackets 43. These brackets are each in the form of an elongated loop and are mounted for slidable movement upon the pin 46 supported in a boss 47 formed on the mounting plate 25. The brackets are retained by washers 48 and cotter pins 49.

In operation, the springs yieldably urge the seat to a central or given position. Thus, in Fig. 9, for example, movement of the seat and hence posts 41 to the left will be resisted by the spring at the top of the figure while movement of the seat in the opposite direction will be resisted by the other spring. The sliding brackets 43 maintain the springs in normal taut but not stretched condition by reason of the brackets abutting the posts. The extent of movement of the seat is limited by bumper posts 45 on the seat which are positioned to abut, respectively, the ends of plate 25.

It is a feature of the invention that means are provided for holding the seat in adjusted position after a person has adjusted it. This means includes two dogs 51 which are pivotally mounted on the aforementioned pin 46. The lower ends of these dogs abut the upper surface 52 of the cup 30 when the seat is depressed sufficiently causing the upper edges 53 of the dogs to firmly engage the undersurface of the base plate. The means also includes a hydraulic control unit, generally indicated by 55 (Figs. 3 and 5), which is designed to prevent the seat being depressed for a predetermined lapse of time after a person sits on it.

Referring particularly to the control unit mechanism 55, which is best illustrated in Figs. 5-7, this mechanism includes a cylinder 56 which is mounted on the column or standard 12 by means of a split collar 57, the cylinder being provided with ears 58 (Fig. 8) which are attached to the collar by means of screws 59. Mounted in the cylinder and received in an opening 61 in the collar, is a piston 62 which carries a roller 63 at its upper end. The roller is mounted on a pin 64 which is supported by a bifurcated upper end portion 65 formed on the piston. The roller is designed to ride on a track 68 formed on the undersurface of the mounting plate. This track is inclined from a pair of high spots 69 at each side to a low spot 70 intermediate thereof. As a result, the seat tends normally to return to the position in which it is shown in the drawing under the influence of gravity and the roller 63 coacting with the track, the roller being forced upwardly by a spring 90 later to be described. In this connection, in Fig. 5, spring 34 is shown fully extended or in normal position. The ends of the track terminate in abrupt shoulders 71 which limit the amount of rotation of the parts.

The control unit prevents downward movement of the seat unless the seat is correctly oriented rotatively to the standard supporting it, as when the roller 63 is on the lowest portion of the track. The piston 62 has a pair of enlarged portions 72 and 73 spaced apart by a hollow stem 74 having a fluid passage 75 therethrough. The portions 72 and 73 have packing rings 76 and 77 which make sealing engagement with the wall of the cylinder dividing the cylinder into an upper chamber 78 and a lower chamber 79. The passage terminates at its upper end in ports 80 which provide communication to chamber 78. A valve 81 controls passage 75 and is urged to closed position by a spring 82. The valve includes a stem 83 provided with a forked outer end 84 which is slidably mounted on end 65 of the piston. The valve is depressed to open position when the fork rides on a pair of detents 85 on the underside of the mounting plate.

The enlarged portion 73 of the piston is provided with several by-pass ports 86 which are controlled by a disc valve 87. The valve is enclosed by a housing 88 centrally apertured at 89. A spring 90 interposed between the end wall 56' of the cylinder and the housing, serves to return the piston to upward position.

The device also includes a metering pin 92 which normally rests on the housing and which, as shown in Fig. 6, will rise upwardly in the passage 75 as under the influence of a heavy or sudden weight on the seat, causing rapid flow of fluid through the passage as the piston is forced down, thereby increasing resistance to flow of fluids from the lower chamber 79 through the piston to the upper chamber 78. The lower end of the pin is slotted at 93 to prevent the pin acting as a check valve for opening 89 through housing 88.

In the operation of the device, a person sits on the seat and adjusts the same forwardly or backwardly to a desired position. Assuming, then, that the seat is facing the counter or other given direction for which it is set such as to bring the roller 63 of the control mechanism at the lowest point of the track and to bring the forked end 84 of the valve 81 in position to be actuated by the detents 85, the valve will be opened and fluid will be free to flow upwardly through passage 75 from the lower chamber to the upper chamber, the valve disc 87 being effective to close the by-pass passages 86 as shown in Fig. 6. Depending upon the weight of the object on the seat, the metering pin 92 will be effective in the case of a heavy load to increase resistance to flow of fluid through the device. As the fluid escapes from the lower chamber to the upper chamber, the seat will gradually settle until the dogs 51 engage the upper surface of the sleeve 30 and are thereby forced into holding engagement with the undersurface of the seat base plate. This serves to lock the device in the adjusted position.

After the person leaves the seat, the seat is initially raised by springs 34 and 90 freeing the dogs 51 and hence releasing the seat relative to plate 25 and the standard 12. Springs 40 then slide the seat to normal position as the seat continues to rise to full height under the influence of springs 34 and 90. During this rising movement, the liquid in the upper chamber 78 of the control unit returns to the lower chamber 79 through the passages 86. If the seat is turned to one side, it is rotated to central position by the interaction of roller 63 and track 68.

Preferably the exposed parts of the mechanism are substantially enclosed by a casing 95 which serves as a safety guard to prevent any clothing or other extraneous objects from getting caught in the mechanism. This casing may comprise a piece of sheet metal formed to provide base flanges 96 and 97 secured to the seat frame 17 and depending inwardly curved ends 98 and sides 99 leaving an opening 100 of sufficient size to permit movement of the seat.

In Figs. 11-13, there is shown a preferred form of the invention for a device designed to be originally built into a seat, the previously described form being more in the nature of an attachment for present-day seats.

In these figures, reference numeral 104 generally indicates the base plate frame which may be considered as attached to the frame of a counter seat in any suitable manner, or, as previously described. A mounting plate 105 is provided which carries four rollers 106 which ride on the margins 107 of the base plate. In this form of the invention, all of the control apparatus is mounted within the column or standard which is shown as tubular and indicated by numeral 109. The column supports a bushing 110 in which is mounted the control mechanism and center support for the seat. The mechanism includes a cylinder member 111 which is supported in the bushing by means of a screw 112. The cylinder is externally threaded at its lower end to receive a hold-down fitting 113 which receives a bolt 114 which may be considered as being secured at the bottom of the standard in any suitable manner.

The cylinder 111 includes a pair of spaced sleeves 116 and 117 which are mounted therein by means of pins 118 and 119. The upper sleeve 117 serves as a guide for the central mounting pin 120 of the unit which is reduced at its upper end at 121 and received in an opening 122 in a boss 123 formed on the mounting plate. The upper end may be threaded to receive a nut 124. Immediately beneath the mounting pin is a piston 125, generally similar to piston 62, which includes spaced enlarged portions 126 and 73a and an intermediate hollow stem 74a. The lower end portions of the piston and cylinder are constructed the same as the piston and cylinder previously described and the parts thereof have been designated by the same reference numerals distinguished by the suffix "a." The upper part 126 of the piston is keyed to sleeve 116 by a key 128 slidable in groove 129 in the sleeve.

The lower end of the mounting pin and the upper end of the piston are provided with co-operating cam faces 130 and 131 which serve to return the seat to a predetermined position under the influence of gravity. When in the position shown, the lower end of the mounting pin is effective to depress the stem 134 of the control valve 135 which serves the same purpose as the valve 81 of the unit previously described.

In order to provide for locking the base plate and the mounting plate against relative movement, the mounting plate is provided with four pivotally mounted dogs 126 which are adapted to engage a hardened plate 137 on the bushing 110. The dogs are mounted in pairs on pins 138 passing through supporting posts 139 on the mounting plate. When the seat descends sufficiently, the surfaces 140 of these dogs are forced upwardly into tight engagement with the undersurface of the base plate and securely lock the parts.

Rotation of the seat is limited by a pin 145 depending from plate 105 which is positioned to strike abutments 146 (Fig. 12) formed on the bushing 110.

The operation of the device is the same in principle as the operation of the device previously described. A person sits on the seat and it is prevented from immediately descending by the control mechanism including piston 125. The person then has time to adjust the seat to suit himself after which, if the seat is facing the counter or in the predetermined position so that the lower end 130 of the pin can depress the valve stem, 134, the seat will gradually descend until the dogs 126 engage the plate 137 and lock the seat against further movement.

When the person leaves the seat, the spring 90a initially raises the seat raising dogs 126 out of tight engagement with the parts thereby permitting the seat to slidably return to its original normal position under the influence of the springs 40 shown and described in connection with the form of the invention previously described. In the meantime the spring 90a continues to raise the seat to maximum height. If the seat is rotated out of normal position, cam surfaces 130—131 on the pin 120 and piston serve to return the seat under the influence of gravity on the initial upthrust of the spring 90a.

In Figs. 14–17 there is shown another form of the invention which is particularly designed to be built into a counter seat at time of manufacture.

Referring to these figures, numeral 150 indicates a column or standard which is attached to the floor. This standard supports a mounting plate 151 and this in turn supports a seat base plate 152 in a manner to be described later. The seat base plate is attached to the under portion of a counter seat, fragmentarily shown at 153 in Fig. 14.

Mounted in the column 150 is a tubular member or cylinder 155 which is provided with a flange 156 at its upper end. A bushing 157, held in place by screw 158, supports the member 155 in the standard 150. The lower end of cylinder 155 is threaded at 160 to receive a mounting bracket of cup-like shape indicated by 161. This bracket receives a bolt-like rod 162 which may extend to the bottom of the column 150 and be anchored there in a suitable manner.

The upper end portion of the cylinder 155 receives a mounting pin 164 on which the mounting plate 151 is carried by means of a screw 165. The central portion of the mounting plate is provided with a circular reinforcement plate 167 and it and the mounting plate are apertured at 168 to receive the screw 165.

The mounting plate is provided with a pair of upwardly extending, slightly inwardly inclined flanges 170 in each of which is mounted a pair of rollers 171. The seat base plate 152 is provided with depending flanges 173 at each side which terminate in inwardly extending ledges 174 to accommodate the rollers 171.

It will be apparent that with this construction, the seat base plate and the mounting plate are relatively slidable. The rollers 171 being canted or inclined with respect to the flanges 173 provide a simple construction in which there is a minimum of contact between the rollers and the base plate 152.

The ends of the base plate are provided with depending flanges 175 and 176 which cooperate with bumpers 177 and 178 mounted on upturned flanges 179 and 180 respectively of the mounting plate to limit travel of the base plate relative to the mounting plate. A pair of springs 182 are provided for returning the seat to central position. Each of the springs is attached at one end to one of the end flanges of the base plate and at the other end to one of the bumper flanges of the mounting plate as shown in Fig. 15.

Rotation of the mounting plate and seat base plate relative to the column or standard 150 is limited by a pair of ears 184 and 185 formed on the flange 156 of cylinder 155 and by a depending pin 186 on the mounting plate.

As in the other forms of the invention, means are provided for locking or holding the seat plate against movement relative to the mounting plate and for holding both of these plates against rotation relative to the column or standard. In this form of the invention, this means comprises a pair of fiber pins 190 mounted in bores 191 in the mounting plate. The lower ends of these pins are adapted to abut the flange 156 when a weight is imposed on the seat thereby forcing the upper ends of the pins in tight engagement with the undersurface of the seat base plate.

In order to prevent the immediate actuation of the pins 190 when a person sits on the seat, a hydraulic control unit is provided which prevents the seat from descending except when the seat is facing in a given direction, and delays the descent of the seat. The control unit includes a piston 192 which is provided with a stem portion 193 having an upper head 194 at its upper end and a lower head 195 at its lower end. The head 194 is provided with a diagonally extending flat upper cam surface 196 which cooperates with a corresponding surface 197 on the lower end of pin 164. With this arrangement, the cam surfaces 196 and 197 serve to return the seat to the position in which it is shown, should the same be rotated to one side or the other. The travel of the piston is limited by a screw 198, the inner end of which rides in a groove 199 in the piston.

The lower head 195 of the piston is fitted with a cup packing 200 which serves to seal against upward movement of fluid past the piston but which permits downward movement of fluid therepast. The stem 193 is provided with a longitudinally extending passage 202 (see Fig. 17) in which is mounted a valve stem 203 having a valve 204 which seats against an inclined shoulder 205 in the passage 202. Immediately above the valve 204 is a port 207 which communicates with an annular chamber 208 between the head portions of the piston. The valve 204 is normally held seated by a spring 209 which bears against a metering pin 210 supported on a cross pin 211 mounted in a tubular extension 192a at the lower end of the piston 192.

The piston and associated parts are forced upwardly by a spring 212 which is interposed between the piston and the lower end wall 213 of the cylinder.

Figure 14:
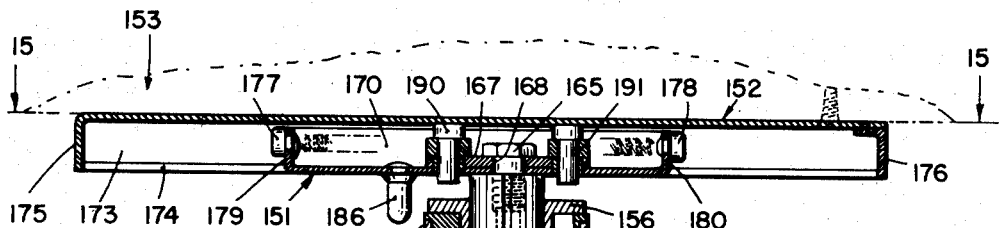
Fig. 14 is a sectional elevation of another form of the invention.
Figure 17:
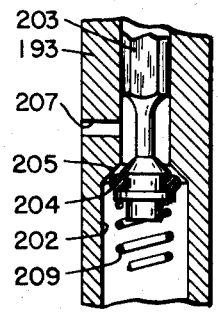
Fig. 17 is an enlarged fragmentary view of the valve member of the control unit.
Figure 16:
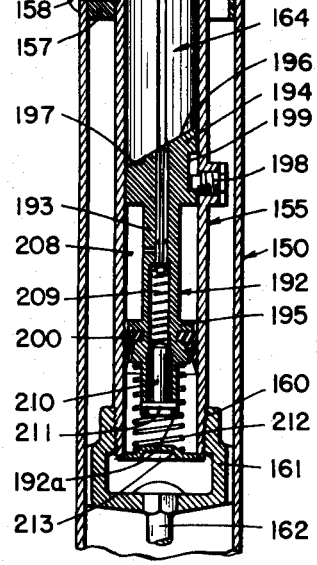
Fig. 16 is a fragmentary section on line 16—16 of Fig. 15.

When the mounting pin 164 and the piston 192 are oriented in the position in which they are shown in Fig. 14, the valve stem 203 is depressed by the cam surface 197 of the mounting pin thereby opening valve 204 which permits escape of hydraulic fluid from the space below the head 195 of the piston through passage 202 through the piston and out into the annular chamber 208, thereby permitting the piston and mounting pin and the seat itself to descend until it rests on the pins 190 which serve to lock or hold the seat against rotation and sliding movement.

It will be apparent that when the seat is rotated, pin 164 will rise on the upper cam surface 196 of the piston permitting the valve 204 to close. Thus unless the seat is in the position shown, the piston cannot descend.

When a person sitting on the seat leaves it, the seat is pushed up by the spring 212 and this, together with the force of gravity, through the interaction of the cam surfaces 196 and 197 serves to return the seat rotatively to its normal position. At the same time, springs 182 serve to slide the base plate and seat on the mounting plate to central position. During upward movement of the piston, the fluid in chamber 208 escapes downwardly past the cup packing 200 into the chamber beneath the piston. The metering pin 210 operates in the same manner as the metering pins previously described.

Although the invention has been particularly shown and described, it is contemplated that various changes and modifications can be made without departing from the scope thereof as defined in the claims.

I claim:

1. An adjustable seating device comprising a seat member adapted to accommodate a person, a support member adapted to stand on a floor, seat mounting means connecting said members for limited lateral sliding movement of said seat member, relative to said support member, and means responsive to a weight imposed on said seat member for holding said members against relative movement, said holding means being effective only after a time delay from the time a weight is imposed on the seat member.

2. An adjustable seating device comprising a seat member adapted to accommodate a person, a support member adapted to stand on a floor, seat mounting means connecting said members for limited lateral sliding movement of said seat member, relative to said support member and for rotation of said seat member relative to said support member, and means responsive to a weight imposed on said seat member for holding said members against relative movement when said members are rotatively oriented in a given position.

3. An adjustable seating device comprising a seat member adapted to accommodate a person, a support member adapted to stand on a floor, seat mounting means connecting said members for limited lateral sliding movement of said seat member, relative to said support member and for rotation of said seat member relative to said support member, and means responsive to a weight imposed on said seat member for holding said members against relative movement when said members are rotatively oriented in a given position, said holding means being effective only after a time delay from the time a weight is imposed on the seat member.

4. An adjustable seating device for use as a counter stool or the like comprising an upright standard adapted to be mounted on a floor, a seat member adapted to accommodate a person, a mounting bracket, means supporting said bracket for rotation and for limited vertical movement on said standard, means slidably supporting said seat member on said mounting bracket for limited lateral movement, seat holding means responsive to a weight imposed on said seat member for holding said seat member against movement, and means for preventing the immediate operation of said seat holding means when a weight is imposed on said seat member.

5. An adjustable seating device for use as a counter stool or the like comprising an upright standard adapted to be mounted on a floor, a seat element adapted to accommodate a person, a mounting bracket, means supporting said bracket for rotation and for limited vertical movement on said standard, means slidably supporting said seat element on said mounting bracket for limited lateral movement, seat holding means mounted on said mounting bracket for engagement with said standard, said seat holding means being engageable with and actuated by said seat element upon downward movement of said seat element, and means for preventing immediate downward movement of said seat element under the influence of a force tending to move the same down.

6. An adjustable seating device for use as a counter stool or the like comprising an upright standard adapted to be mounted on a floor, a seat element adapted to accommodate a person, a mounting bracket, means supporting said bracket for rotation and for limited vertical movement on said standard, means slidably supporting said seat element on said mounting bracket for limited lateral movement, seat holding means mounted on said mounting bracket for engagement with said standard, said seat holding means being engageable with said seat element upon downward movement of said seat element, and means for preventing immediate downward movement of said seat element under the influence of a force tending to move the same down, said last mentioned means including a hydraulic piston and cylinder unit adapted to gradually resist downward movement of said seat element.

7. An adjustable seating device for use as a counter stool or the like comprising an upright standard adapted to be mounted on a floor, a seat element adapted to accommodate a person, a mounting bracket, means supporting said bracket for rotation and for limited vertical movement on said standard, means slidably supporting said seat element on said mounting bracket for limited lateral movement, seat holding means mounted on said mounting bracket for engagement with said standard, said seat holding means being engageable with said seat element upon downward movement thereof, means for preventing immediate downward movement of said seat element under the influence of a force tending to move the same down, said last mentioned means including a hydraulic piston and cylinder unit adapted to gradually resist downward movement of said seat element when tripped, when said seat element is in a given position rotatively with respect to said standard and adapted to prevent downward movement of said seat element when said seat element is not in said given position, and means for tripping said unit when said seat element is in said given position.

8. An adjustable seating device for use as a counter stool or the like comprising an upright standard adapted to be mounted on a floor, a seat member adapted to accommodate a person, a mounting bracket, a cylindrical pin dependently carried by said bracket, said standard providing a cylindrical recess slidably and rotatably receiving said pin means slidably supporting said seat member on said mounting bracket for limited lateral movement, a dog pivotally mounted on said bracket, said dog being adapted to engage said standard and having a portion engageable with said seat member to limit downward movement of said bracket relative to said standard, a hydraulic piston and cylinder unit supported by said standard and having a part engageable with said mounting bracket, said unit having a control valve and being adapted to prevent movement of said bracket toward said standard when said control valve is closed and being adapted to gradually resist movement of said bracket toward said standard when said control valve is open, and a control valve actuating member carried by said piston and cylinder unit engageable by said bracket to open said valve when said seat member and bracket are in a given rotative position relative to said standard.

9. An adjustable seating device for use as a counter stool or the like comprising an upright standard adapted to be mounted on a floor, a seat member adapted to accommodate a person, a mounting bracket, a cylindrical pin dependently carried by said bracket, said standard providing a cylindrical recess slidably and rotatably receiving said pin means slidably supporting said seat member on said mounting bracket for limited lateral movement, seat stop means mounted on said mounting bracket for engagement with said standard, said seat stop means being engageable with said seat member upon downward movement of said seat member, and means for preventing immediate downward movement of said seat member under the influence of a force tending to move the same down, said last mentioned means including a hydraulic piston and cylinder unit adapted to gradually resist downward movement of said seat member, said unit including means responsive to the force acting upon said seat member to increase the resistance of said unit in proportion to the force imposed on said seat member.

10. An adjustable seating device for use as a counter stool or the like comprising an upright standard adapted to be mounted on a floor, a seat member adapted to accommodate a person, a mounting bracket mounted for rotation and for limited vertical movement on said standard, means slidably supporting said seat member on said mounting bracket for limited lateral movement, a dog pivotally mounted on said bracket, said dog being adapted to engage said standard and having a portion engageable with said seat member upon downward movement of said bracket relative to said standard, a hydraulic piston and cylinder unit supported by said standard and having a part engageable with said mounting bracket, said unit having a control valve and being adapted to prevent movement of said bracket toward said standard when said control valve is closed and being adapted to gradually resist movement of said bracket toward said standard when said control valve is open, a control valve actuating member carried by said piston and cylinder unit engageable by said bracket to open said valve when said seat member and bracket are in a given rotative position relative to said standard, and interengaging cam means on said mounting bracket and a part carried by said standard for causing said seat member to rotate under the influence of gravity to a given position.

11. A device as defined in claim 10 in which said interengaging cam means comprises an inclined track on said mounting bracket and a roller mounted on said piston and cylinder unit.

12. A device as defined in claim 10 in which said interengaging cam means comprises a pin on said mounting bracket having a cam face bearing upon a cam face formed on the piston of said piston and cylinder unit.

13. A device as described in claim 10 which includes spring means cooperating with the cam means to initiate said rotation when the seat is out of normal position.

14. In an adjustable seat construction, a supporting assembly adapted to be mounted on the floor or the like and including a part mounted for limited vertical movement, a seat plate, means mounting said seat plate on said part for limited lateral movement relative thereto, means carried by said supporting assembly yieldably urging said part upwardly, a friction brake button mounted in said part for limited vertical movement and having an upper end portion adjacent the under surface of said seat plate, said button engaging a stationary portion of said supporting assembly and being limited in its downward movement thereby whereby the upper end portion engages the under surface of said seat plate upon downward movement of said seat plate under the influence of a load thereon.

CARL F. CARAMELLI.

References Cited in the file of this patent

UNITED STATES PATENTS

| Number | Name | Date |
| --- | --- | --- |
| 491,097 | Gould | Feb. 7, 1893 |
| 1,374,413 | Webb | Apr. 12, 1921 |
| 1,427,764 | Stuebing et al. | Aug. 29, 1922 |
| 1,488,024 | Nichols | Mar. 25, 1924 |
| 1,698,784 | Erickson | Jan. 15, 1929 |
| 1,827,627 | Travis | Oct. 13, 1931 |

FOREIGN PATENTS

| Number | Country | Date |
| --- | --- | --- |
| 586,347 | Great Britain | Mar. 14, 1947 |